Patented Jan. 12, 1954

2,665,992

UNITED STATES PATENT OFFICE 2,665,992

SEALING COFFEE BEANS

Marguerite Naps, Oakland, Calif.

No Drawing. Application July 10, 1951,
Serial No. 236,057

7 Claims. (Cl. 99—167)

This invention relates to a method of coating roasted coffee beans whereby the flavor value of the coffee beans is preserved and the development of rancidity is retarded.

A coffee bean is essentially a cellulosic material consisting of many cells and an outer coating or cover. On roasting, various chemical changes occur in the bean and the characteristic aroma of coffee is developed. Carbon dioxide is also formed during the roasting process. The flavor-bearing substance which is formed upon roasting is present in very small amounts and tends to evaporate along with the carbon dioxide and other substances present in the roasted bean. The rate of evaporation is, of course, greatly accelerated when the beans are ground and the cellulose structure and natural coating of the bean is ruptured. The flavor-bearing and aroma-bearing substances are therefore lost and the coffee prepared from the ground beans is not as distinctive in taste as is desired. In addition, coffee acquires a stale, flat taste because of the development of rancidity. The flavor deterioration is caused by the chemical changes which occur upon absorption of oxygen from air.

Various processes and techniques have been practiced or suggested to improve the keeping qualities of coffee and thus retain a maximum amount of the coffee essence and to prevent the formation of substances which produce a stale flavor. Frequently coffee is packed under vacuum in sealed containers in an effort to prevent this deterioration of quality. Vacuum packing does not prevent these changes from taking place, but merely retards them. In addition, vacuum packaging is a very expensive process and increases the cost of the coffee to the consumer.

Another process which has been proposed for the prevention of deterioration is the so-called glazing process. In this process, a thin glaze is applied to the surface of the coffee bean which has some effect of retarding the development of flavor changes, but which is primarily designed to improve the appearance of the coffee beans by making them appear glassy. Various substances have been proposed for the glazing of coffee, such as egg albumen, glucose, glycerin, palm oil, gum arabic, shellac, starch, glycerinated sugar and gum tragacanth. However, the so-called glazing process actually has only a very limited preserving effect and, in addition, frequently imparts an off taste to the coffee since many of the substances used in the glazing process have flavors of their own.

It is an object of the present invention to provide a process whereby freshly roasted coffee may be treated with a sealing substance which preserves the delicate flavor imparting properties of the coffee and retards the development of rancidity in the coffee.

It is a further object of this invention to provide such a process in which the coating agent imparts no taste or odor to the coffee.

Another object of this invention is to provide a coating process wherein the coating agent does not prevent the coffee from being ground and brewed in the usual manner.

In general, the objects of my invention are achieved by treating freshly roasted coffee with a solution or dispersion of a film-forming substance and then drying the treated beans so that a tough, impervious film, which is extremely thin, seals the surface of each bean.

The material used to seal the roasted coffee beans must possess the following properties:

1. They must be non-toxic.
2. They must be odorless and tasteless.
3. They must not produce a foreign flavor in the coffee or brewed coffee.
4. They must be water soluble or dispersible.
5. They must form a tough, transparent film.
6. The film must be impermeable or only slightly permeable to the volatile components of coffee, to air, and to water vapor.
7. The film-forming agent must be stable and not decompose upon aging.

The compounds which have been suitable for such a use are high molecular weight organic compounds and include the following:

1. Ethers of cellulose and starch such as methyl cellulose, ethyl cellulose, hydroxyethylcellulose, methyl starch and ethyl starch.
2. Carboxy derivatives of cellulose and starch (particularly the alkali metal salts) such as sodium carboxymethylcellulose and sodium carboxymethylstarch.
3. Inorganic esters of cellulose and starch (particularly the phosphates and sulfates) such as sodium cellulose sulfate, sodium starch sulfate, sodium cellulose phosphate and sodium starch phosphate.
4. Polyvinyl alcohol, which is a polymer prepared by hydrolyzing the acetate groups of polyvinyl acetate. Polyvinyl acetate is prepared by polymerizing monomeric vinyl acetate to a high molecular weight chain molecule.

The preferred materials are the cellulose derivatives such as methylcellulose, hydroxyethylcellulose and sodium carboxymethylcellulose, as these materials are readily available, easy to handle, form aqueous solutions and are relatively inexpensive. Further, these particular materials have long been used in food and are known to be non-toxic.

In the preparation of the sealing or coating composition it is preferred to use an aqueous solution, as water does not have any harmful effect on the coffee flavor, the drying procedure is safe and relatively simple and no solvent recovery problem is present. However, other solvents may be used for the various coating compositions.

The concentration of the coating composition can vary from about 2 to about 20% by weight of solid material. If less than 2% of the coating material is used, an excessive amount of the water or other solvent must be evaporated, while if the solution is made much over 20%, it becomes so viscous that it is difficult to apply it evenly to the coffee beans.

Various processes can be used in applying the sealing substance to the coffee bean. Methods of applying the coating substance include dipping the beans in the solution, or spraying the coffee beans with the solution of the material while the beans are tumbled in a rotary drum, while the beans are blown in a stack or conveyed on a belt. The beans are then dried, preferably at an elevated temperature, either by passing them on a conveyor through a tunnel through which hot air is blown, tumbling them in a drum, or blowing them in a stack. Infra red drying can be used to advantage. The drying temperature may be between 180° F. to 400° F.

It is advantageous to apply the coating film immediately after the beans are roasted and it is not necessary that the bean be cold before the coating material is applied. In fact, it is often advantageous to apply the coating substance while the beans are still hot from the roasting process as the loss of volatile oil from the beans is minimized and the heat of the beans can be used to supply at least part of the heat necessary to dry the beans. Some of the coating materials gel at higher temperatures and if the coating gels when applied to the hot beans, it is advantageous to cool the beans for a short time prior to drying.

In addition to the drying methods outlined above, it is also possible to subject the beans to reduced pressure to remove a major portion of the water or other solvent and then heat the beans mildly at slightly elevated temperatures to complete the drying.

Although this invention relates primarily to the use of a coating film which has no taste or odor of its own but which preserves the coffee beans, it is possible to add other substances to the coating material such as coloring agents to improve the color of the coffee, antioxidants to further retard oxidation, vitamins and other compounds of nutritional value, and agents or additives which tend to clarify the coffee brew. Plasticizing agents may also be added to alter the properties of the coating.

Some of the treating agents such as ethyl cellulose are water insoluble and such agents may be emulsified in water by means well-known to those skilled in the art, and used to form the film. Although such films are insoluble in water, they are readily disrupted by hot water and further, the beans are ground prior to preparing the coffee infusion so that fact that the film is not water soluble is not particularly important.

It is particularly advantageous to insolubilize the film after it has been formed. Some of the treating agents such as sodium salt of carboxymethylcellulose and methylcellulose, are known to be excellent agents for suspending fine particles and may act to form a dispersion of fine coffee particles in the finished brew which detracts from its clarity. In addition, the insolubilization treatment has the following advantages:

1. The insolubilized coating is much more water resistant. This is a very important point since penetration of moisture in the bean is very harmful to flavor and accelerates rancidification.
2. The insolubilized coating is tougher.
3. A minute amount of the acidic agents improves the flavor of coffee. Also, the coating could be applied to relatively inferior grades of coffee to "up-grade" the coffee.
4. Minute amounts of acidic materials, especially citric acid, which may be absorbed in the beans stabilizes the coffee oils (retards rancidification).
5. The insolubilized coating usually forms a better film therefore producing a tighter seal. Adhesion to the bean also appears to be better than in the case of the untreated coatings.

It is therefore preferred to add a poly-functional substance which will insolubilize the film by forming cross linkages between the individual molecules. Suitable poly-functional substances are well known to those skilled in the art and include acids such as citric, glutamic, tartaric, trihydroxyglutaric, aconitic, saccharic, malic and aspartic and dialdehydes such as glyoxal, glycollic aldehyde, glyceric aldehyde, and alpha-hydroxyadipaldehyde. The insolubilizing substance can be added to the film-forming cellulose derivative solution and is ordinarily used in amounts of from 5% to 30% by weight, or preferably about 10%, based on the amount of the cellulose derivative in the solution.

The following non-limiting examples illustrate preferred embodiments of the present invention.

*Example 1.*—Freshly roasted coffee was cooled and placed in a strainer and immersed in Methocel solution. The Methocel solution was prepared from 50 grams of powdered Methocel (methylcellulose, Dow Chemical Company, 25 centipoises viscosity grade) and 450 grams of water. The water used for preparing the solution was cold. After immersing the beans in the cold solution they were spread on a stainless steel screen and dried in an oven at approximately 300° F. A hard, impervious film was formed over the surface of the beans. After standing for one month, the beans so treated were compared with a control lot which had not been coated. The treated beans produced a coffee infusion that was much less stale than the control.

*Example 2.*—The process of Example 1 was repeated except that the Methocel solution was made with 5% Methocel of 100 cps. grade. A similar hard, impervious coating was formed on the beans.

*Example 3.*—A solution of hydroxyethylcellulose (approximately 10% by weight) was poured over a small quantity of commercially roasted coffee beans which were in a sieve suspended over a container (the hydroxyethylcellulose used was Cellosize WS, low viscosity grade. Hercules Powder Co.). The solution which drained through the sieve was then again poured over the beans. The coated beans were placed on a metal plate, separated and dried in an oven at 325° F. The drying time was approximately 10 minutes. A satisfactory film was formed over the surface of the beans.

Example 4.—Freshly roasted coffee beans (blend of Brazilian coffees) were coated with a 10% by weight aqueous solution of cellulose gum. Cellulose gum is sold by the Hercules Powder Company and consists of sodium carboxymethylcellulose. After the solution had been poured over the hot beans, the beans were stirred slightly to ensure complete coverage and the beans were then spread on a stainless steel screen (¼" mesh) and dried in an oven at 325° F. After 20 minutes, the beans were dry and an impervious film had been formed.

Example 5.—To a 10% aqueous solution of 25 cps. viscosity grade Methocel was added 10% by weight of citric acid based on the Methocel in the solution. Freshly roasted hot coffee beans (blend of Brazilian coffees) were placed in a sieve and the citric acid-Methocel solution was poured over them. The solution gelled but on cooling a thick, viscous fluid was formed. The beans were dried on a stainless steel screen in an oven at 325° F. for 20 minutes and an insoluble film was formed over the beans. The treated beans were aged for three weeks and compared with control beans similarly aged but untreated. The treated beans made coffee having a better flavor with less evidence of rancidity than the untreated beans. After standing for four months, the treated beans produced coffee which was definitely better than that made from control beans.

Example 6.—Two batches of Armenio Excelso grade Columbian coffee which had been roasted by a commercial roaster were coated with a solution containing 10% aqueous methylcellulose which contained 10% citric acid (based on methylcellulose content). In the case of one batch of beans, the coating was applied to the cold beans as they were received from the roaster. In the other batch of beans, the beans were preheated prior to the application of the coating by placing them in an oven at 325° F. for fifteen minutes. The coating gelled on the heated beans, but after they had been cooled slightly the coating became fluid and coalesced. Both batches of beans were spread on a stainless steel screen and dried by heating for twenty minutes at 325° F. An excellent film was formed on both batches of beans which had good adhesion and good coverage. Small samples of the film were peeled off of the beans and immersed in water. There was some slight swelling of the coating upon prolonged standing but very little solution occurred.

Example 7.—The process of Example 6 was repeated except that instead of 10% citric acid, 10% tartaric acid was used. Again, the coating was applied to both hot and cold beans and an excellent film was formed over the beans having good adhesion and good coverage. On a repetition of the solubility test, it was again found that the film swelled slightly in water but that it was substantially insoluble.

Example 8.—Two batches of commercially roasted coffees similar to those of Example 6 were coated with a 10% aqueous solution of sodium carboxymethylcellulose containing 10% citric acid (based on the amount of sodium carboxymethylcellulose). The coating was applied to both cold beans and to beans which had been preheated. In neither case did any gelation occur and both lots of beans were then spread on a stainless steel screen and dried in an oven at 325° F. for fifteen minutes. The quality of the film was excellent with good coverage and good adhesion. When samples of the film were peeled off the beans and immersed in water, it was found that the film was insoluble and that very little swelling of the film occurred.

In addition to rendering the film insoluble, coffee which has been treated with citric acid possesses an enhanced aroma and especial flavor, and is preferred by many to untreated coffee.

It is possible to apply the insolubilizing solution separately. Thus, one may first treat the beans with the coating solution and then treat the beans with an insolubilizing solution.

In many instances it has been noted that in drying the treated beans the beans tend to stick on the pan on which they are dried. This may be prevented by first coating the pan with a silicone grease.

Taste tests have been conducted with coffee beans which have been treated in accordance with the present invention, in comparison with untreated beans. After standing for several weeks in the open, coffee beans which have been treated in accordance with the present invention produced coffee having a fresher, richer aroma with less evidence of staling than untreated beans which had been similarly aged. When a coffee infusion is prepared from the treated beans it is much superior in flavor and aroma to coffee prepared from untreated beans.

I claim:

1. The process of treating roasted coffee beans to prevent deterioration thereof comprising forming an impervious film over the surface of the individual beans, said film being composed of a substance selected from the group consisting of methyl cellulose, hydroxyethyl cellulose and sodium carboxymethyl cellulose and a substance selected from the group consisting of citric acid and tartaric acid.

2. The process of treating roasted coffee beans to prevent deterioration thereof, comprising applying to the beans an aqueous solution of methylcellulose and a member selected from the group consisting of citric and tartaric acids and drying the beans.

3. The process of treating roasted coffee beans to prevent deterioration thereof comprising applying to the beans an aqueous solution of hydroxyethylcellulose and a member selected from the group consisting of citric and tartaric acids and drying the beans.

4. The process of treating roasted coffee beans to prevent deterioration thereof comprising applying an aqueous solution of carboxymethylcellulose and a member selected from the group consisting of citric acid and tartaric acid to the beans and drying the beans.

5. The process of treating roasted coffee beans to prevent deterioration thereof comprising applying to the beans an aqueous solution of methylcellulose and citric acid and drying the beans.

6. The process of treating roasted coffee beans to prevent deterioration thereof comprising applying to the beans a solution containing methylcellulose and tartaric acid and drying the beans.

7. The process for treating hot freshly roasted coffee beans comprising adding to the beans an aqueous solution containing methylcellulose and citric acid, cooling the beans to coalesce the coating agent and drying the beans.

MARGUERITE NAPS.

References Cited in the file of this patent

UNITED STATES PATENTS

| Number | Name | Date |
|---|---|---|
| 2,169,250 | Izard | Aug. 15, 1939 |
| 2,210,819 | Reynolds | Aug. 6, 1940 |
| 2,346,755 | Hemming | Apr. 18, 1944 |
| 2,480,103 | Fus | Aug. 30, 1949 |
| 2,558,042 | Cornwell | June 26, 1951 |

FOREIGN PATENTS

| Number | Country | Date |
|---|---|---|
| 325,039 | Great Britain | of 1930 |

OTHER REFERENCES

"Methocel," pamphlet published by Dow Chemical Co., 1949; pages 17 and 56.